INVENTOR
THOMAS E. GANNOE

BY Cyril A. Krenzer

ATTORNEY

INVENTOR
THOMAS E. GANNOE
BY Cyril A. Krenzer
ATTORNEY

INVENTOR
THOMAS E. GANNOE

BY Cyril A. Krenzer

ATTORNEY

Nov. 10, 1970 T. E. GANNOE 3,539,490

PLATING OF STRIPES ON LONGITUDINAL ELECTRICALLY CONDUCTIVE MATERIAL

Filed Nov. 28, 1967 4 Sheets-Sheet 4

INVENTOR
THOMAS E. GANNOE

BY Cyril A. Krenzer

ATTORNEY

United States Patent Office 3,539,490
Patented Nov. 10, 1970

3,539,490

PLATING OF STRIPES ON LONGITUDINAL ELECTRICALLY CONDUCTIVE MATERIAL

Thomas Earl Gannoe, Warren, Pa., assignor to Sylvania Electric Products Inc., a corporation of Delaware Filed Nov. 28, 1967, Ser. No. 686,195
Int. Cl. B01k 3/04; C23b 5/68
U.S. Cl. 204—207 12 Claims

ABSTRACT OF THE DISCLOSURE

A flexible electrically conductive material such as metallic tape is plated with a thin stripe of metal by passing the tape around a groove in the periphery of a disc which is rotated in the direction of travel of the tape. Plating solution is conducted to the peripheral groove of the disc to contact the underside of the tape therein, the solution being confined in a narrow channel in the groove so as to plate only that area of the tape immediately above the channel. Ancillary devices are used to preliminarily prepare the tape for the striping operation and, subsequently to the plating operation, to recover excess plating on the tape, to dry the tape, and coil it on a mandrel.

BACKGROUND OF THE INVENTION

The invention relates to the plating of metals and more particularly to the deposition of a metallic plating to a discrete portion of a flexible electrically conductive material, such as a metallic tape.

Previously, metallic stripes could be applied on a tape of electrically conductive material by several known techniques with varying degrees of success. Conventional procedures such as brush plating and overall plating techniques usually provided lesser thicknesses of plating than was desired in the functional areas. Furthermore, the overall plating process wasted plating material in unnecessary and unwanted areas, such deposition required subsequent steps to remove undesired plating. By the brush plating technique, it was difficult to hold close tolerances in specific areas. The application of metallic stripes by inlay, overlay or continues strip welding techniques usually required strip material of a greater thickness than desired and needed for the finished product.

OBJECTS AND SUMMARY OF THE INVENTION

It is an object of the invention to reduce the aforementioned difficulties and to provide an improved method and means for plating a discrete stripe of metal on a flexible electrically conductive material.

Another object is to provide a method and means for disposing a metallic stripe having uniformity of width and thickness on a metal tape of dissimilar material.

A further object is to provide a rapid and expeditious method and means for applying a metallic stripe of heavy uniform plating to a moving metal tape.

The foregoing objects are achieved in one aspect of the invention by the provision of a method and apparatus for applying a stripe of metal to a flexible electrically conductive material such as a metallic tape. The plating is applied to the moving tape in a rapid and expeditious manner by moving the container for the plating solution along with the tape; the container being fed with fresh plating solution at locations spaced from each other in the direction of travel of the tape. This is accomplished by utilizing a rotating disc having a peripheral groove therein to accommodate the tape; the groove having a narrow channel containing moving plating solution to define the width of the disposed stripe. The speed of rotation of the plating disc is the same as the rate of movement of the tape.

DESCRIPTION OF THE PREFERRED EMBODIMENT

For a better understanding of the present invention, together with other and further objects, advantages and capabilities thereof, reference is made to the following specification and appended claims in connection with the afore-described drawings.

Figure 1A:
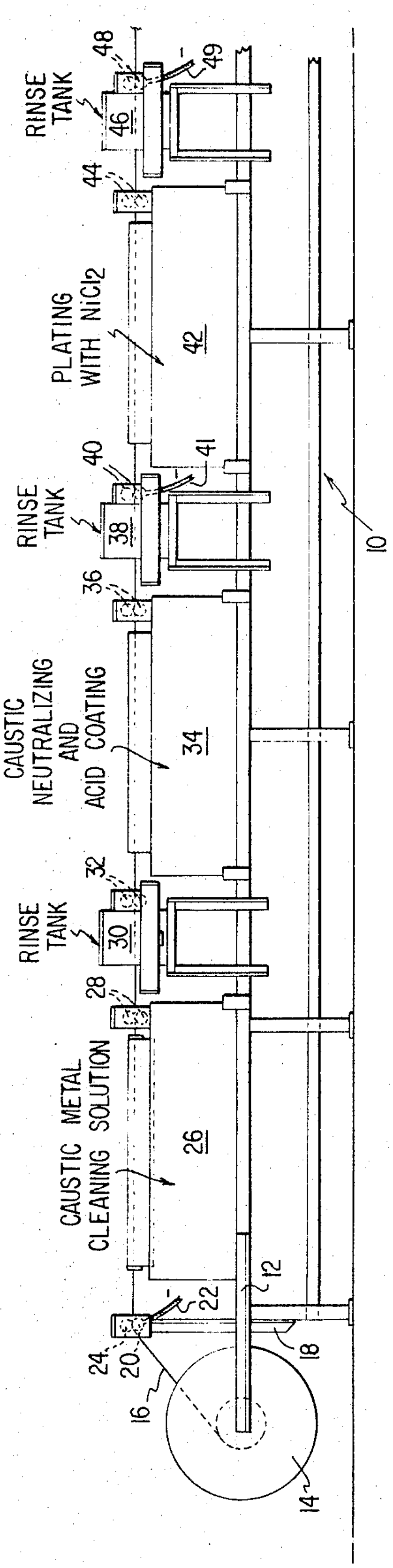
FIGS. 1*a* and 1*b* together comprise a schematic layout of an apparatus for plating a tape.
Figure 1B:
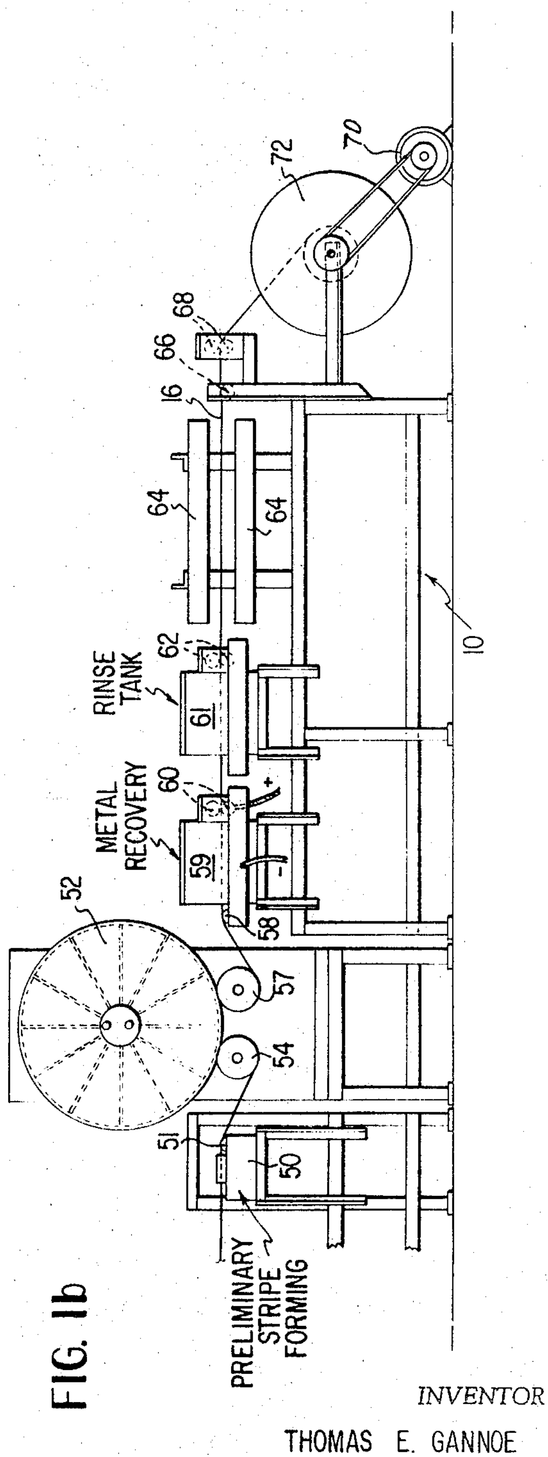

With reference to the drawings, there is shown in FIGS. 1*a* and 1*b* a bench indicated generally as 10, having support arms 12 for supporting in conventional fashion a supply reel 14 of a flexible longitudinal electrically conductive material such as metallic tape 16. The tape may be of any metal and of any width, length and thickness desired. As an example, only, the tape may be of beryllium copper, .009 inch thick, seven-eighths of an inch wide and unlimited length. On this tape there is to be plated, a metal, which may be, for example, a 24 carat gold stripe, .0008 inch in thickness and one-sixteenth of an inch in width.

The tape is pulled through cooperating rollers 20 and 24 accommodated on roll stand 18. At least one of the rollers of the roll stand, as lower roller 20, is of metal, connected by any suitable means to the negative pole of a D.C. source of supply, as through a conductor 22 and a metal bearing supporting the roller. The other roller, as upper roller 24, may be of rubber, such rubber being springpressed onto the tape to effect good electrical contact of the tape with the lower roll. The tape is initially passed through a tank 26 on the bench, said tank containing a caustic metal-cleaning solution, thence past a pair of squeeze rolls 28 into a caustic rinse tank 30, past another pair of squeeze rolls 32 and into a caustic neutralizing and acid coating tank 34 containing, for example, a 50% hydrochloric acid solution. After passing through the tank 34, through squeeze rolls 36, and through hydrochloric acid rinse tank 38, the tape passes through a pair of rollers 40 positioned on a roll stand similar to roll stand 18. At least one of the rollers is metal and has a cathode lead 41 connected thereto. The tape is then pulled through a plating tank 42 containing a solution of nickel chloride, the electrolytic solution in the tank contacting an anode in the tank as is conventional in the art. The purpose of the nickel chloride plating is to deposit a thin film or strike of nickel on the tape substrate, so that the metal, such as gold, subsequently plated on the tape will have good adherence thereto.

After being pulled through the nickel plating tank, the tape passes through the squeeze rollers 44, nickel chloride rinse tank 46, and contactor rollers 48 which are similar to those positioned on stand 18, with a cathode lead 49 being connected to at least one of the rollers. The purpose of using the contactor rolls in the contactor roll stands is to ensure that the tape is electrically connected to the cathode of the source of electrical supply. The various tanks described herein may be heated if desired. The cleaning of the metal is by means known in the art and need not further be described. The application of a nickel strike to the tape while enhancing the quality of the final product is not absolutely necessary and may, if desired, be omitted.

After the tape has been drawn through the nickel chloride rinse tank it is preferably initially given a thin strike in stripe form of the metal which is to be subsequently applied in heavier stripe form on the tape. As shown in the drawings, the tape is drawn through a gold stripe electrolytic tank 50, which has within it a very narrow sponge longitudinally oriented in the direction of movement of the tape and of the width of the stripe desired; the spenge being positioned to rub against the under face of the tape. The sponge is partially immersed in tank 50 containing an acidulated solution of gold salts, the solution being in electrical connection with an anode within the tank which is connected to the D.C. supply so that, through the saturated sponge, an electrolytic plating action is consummated on the moving tape.

The tape, after passing over a direction changing roll 51, is next passed around and in tight engagement with a peripheral portion of an insulating disc 52 mounted on a horizontal axle. As the tape is pulled in an advancing manner, it effects rotation of the disc. It is while the tape is on this disc that the metallic stripe of predetermined thickness is applied. The thickness of the plating depends on the velocity of movement of the tape (and therefore the rotational velocity of the wheel), the concentration and rate of continuous replenishment of the plating electrolyte, the effective depth of the electrolyte, temperature, electrical conditions etc., all of which are empirically determined for the results desired.

Figure 2:
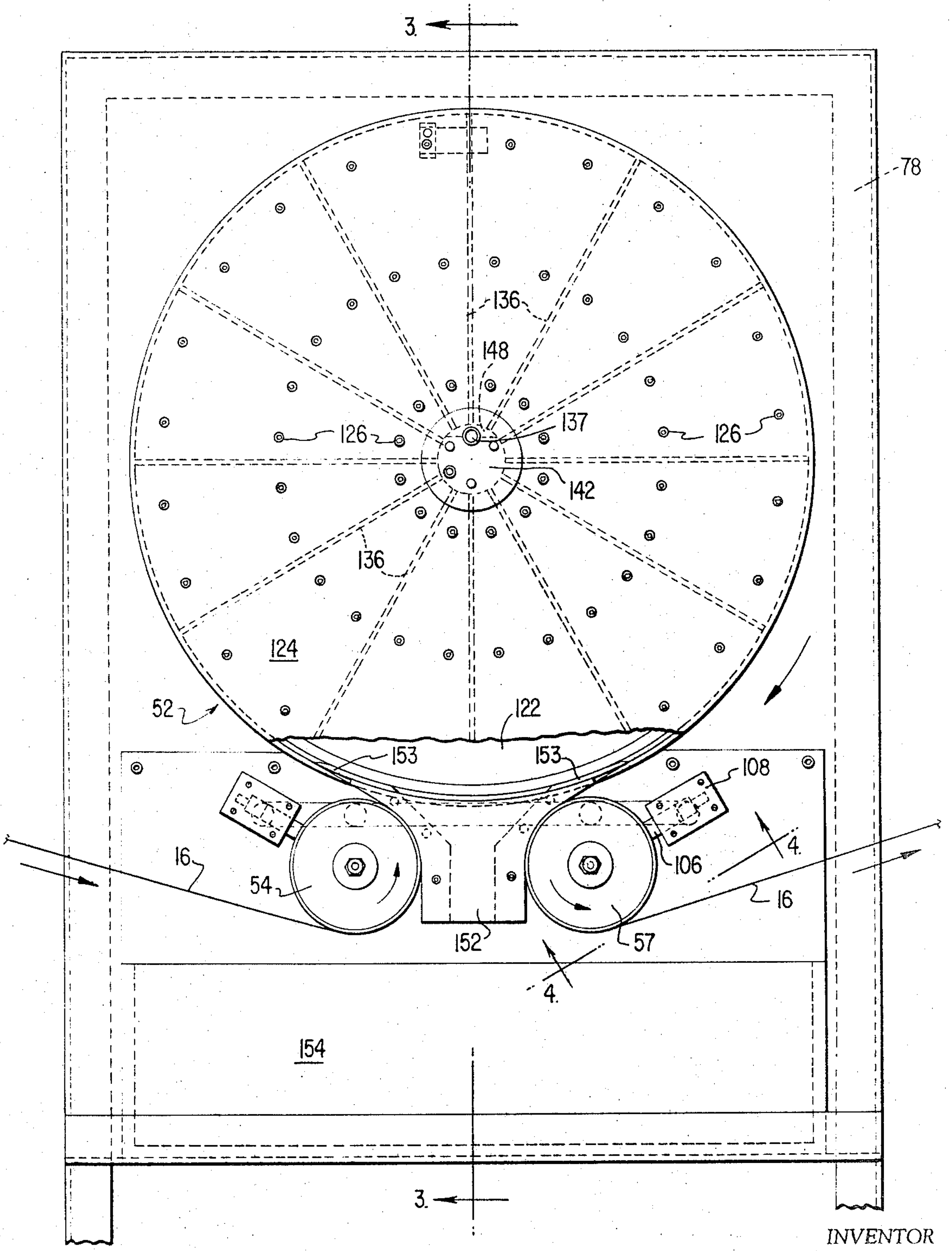
FIG. 2 is an elevational view; partly in section, of a plating disc and adjacent parts.

In the form of invention illustrated in FIG. 2, the tape is passed beneath and around a metallic guide roller 54 near the bottom of the disc 52 and up and around the roller and around the disc for substantially the greater portion of its circumference. The tape rides tautly in a groove 56, FIGS. 3 and 5 formed in the circumference of the disc. The construction of this disc will be described in greater detail subsequently.

After passing about the disc 52, the tape is trained around a second metallic guide roller 57 and over a direction controlling roller 58 into and through a deplating or precious metal recovery tank 59 having a cathode connected to an independent source of D.C. supply where any small amount of metal which may have been deposited on the tape outside of the stripe area, by reason of seepage of electrolyte or otherwise, is removed. However, because the undesired deposit is very thin, the amount of deplating action is very little and affects the stripe to an exceedingly limited degree so that only a very small percentage of the thickness of the stripe itself is removed.

Figures 6, 7, 8:
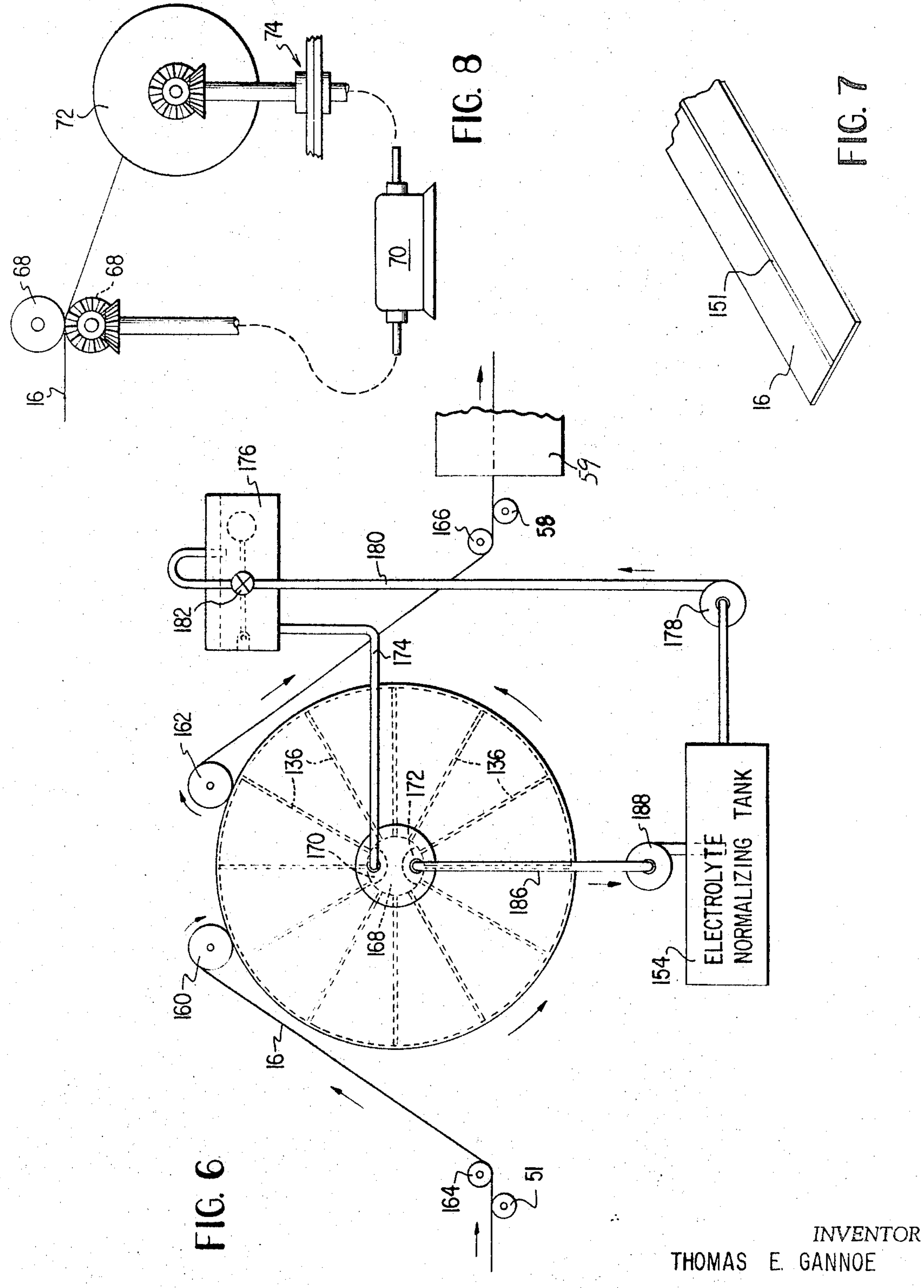
FIG. 6 is an elevational view, partly in section, of a modified form of plating disc and adjacent parts.
FIG. 7 is a view of a fragmentary portion of a tape having a stripe thereon applied in accordance with this invention.
FIG. 8 is a diagrammatic view of a tape drive and takeup mechanism.

After passing through the metal recovery tank, in this case the gold recovery tank, the strip is pulled through metal squeeze rollers 60 connected to the positive pole of the independent D.C. supply, FIG. 1*b*, a final rinse tank 61, squeeze roller 62 and in the space between an elongated spaced parallel pair of heaters 64, and a guide roller 66. The tape in this form of invention is driven by a pair of tape drive rolls 68, as shown in FIG. 8, which are in turn driven by an appropriate motor 70. The tape is then wound on a take-up reel 72, the reel being driven through a slip clutch 74 from the motor means 70. Obviously, the tape may be driven synchronously with the rotation of disc 52 by other suitable means not shown.

Figures 3, 4, 5:
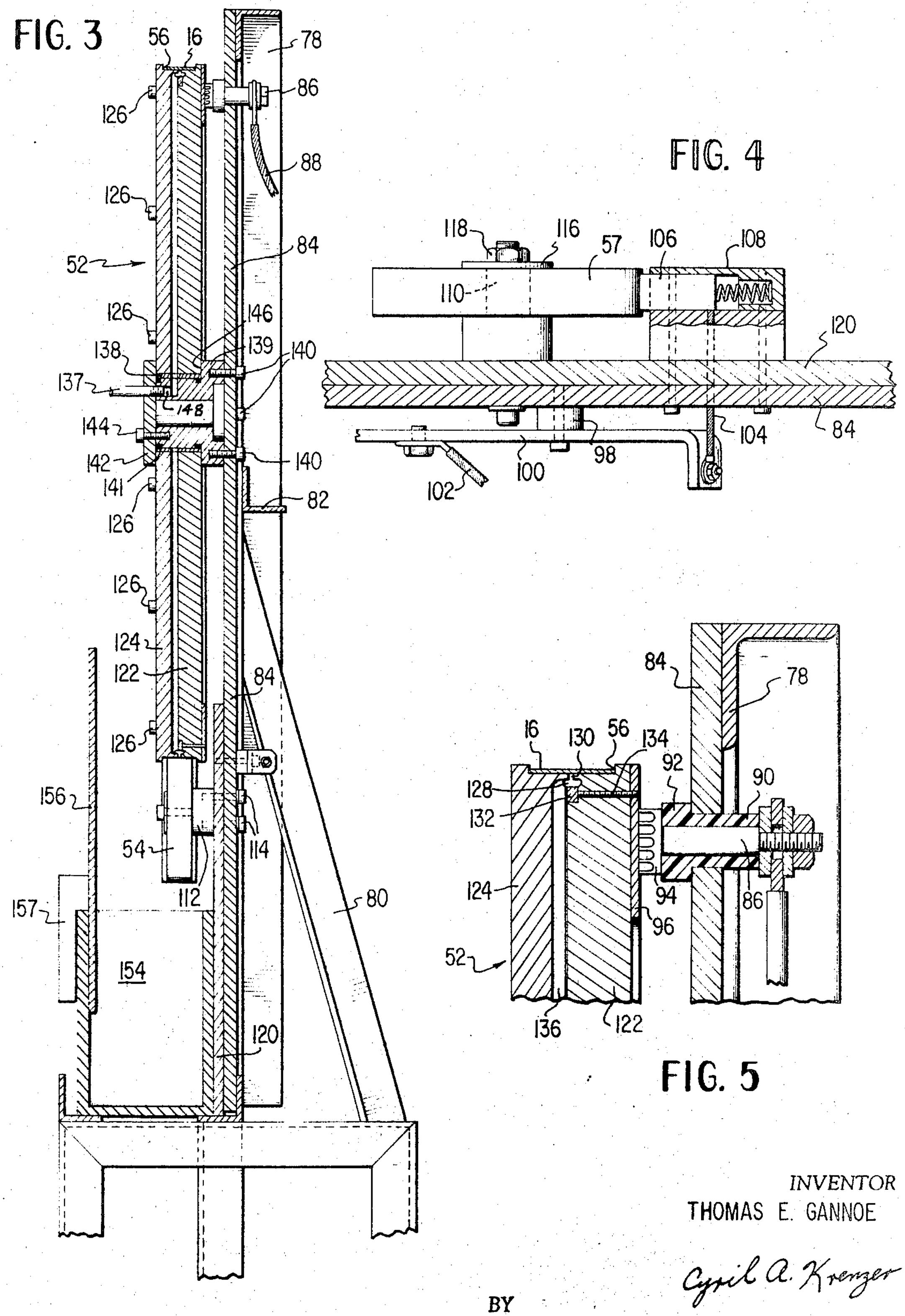
FIG. 3 is a section taken along the line 3—3 of FIG. 2.
FIG. 4 is a view of parts, partly in section as viewed from the plane of line 4—4 in FIG. 2.
FIG. 5 is an enlarged sectional view of the upper portion of FIG. 3.

Adverting to FIGS. 2 and 3, it will be noted that the bench supports a vertical inverted U-shaped frame 78 of angle irons supported by struts 80, one on each side of the frame, the frame being reinforced by a horizontal angle iron 82. The frame members are further reinforced through being spanned by a metallic web mounting plate 84 which plate also serves the purposes of supporting the disc 52 and the two guide rolls 54 and 57. Also supported on the plate is a conductive stud 86 to which is connected the cable 88 leading to the positive pole of the D.C. source. The stud passes through an insulating bushing 90, see FIG. 5, and has a spacer 92 thereabout, the stud being provided with spring fingers 94, the spring fingers bearing against a circular conducting ring 96 mounted on the back of the disc 52.

Also fixed to the web 84, see FIG. 4, as by stand-off bushings 98 is a conductive bar 100 connected by a lead 102 to the negative pole of the D.C. source. This bar is connected by pigtails 104 to conductive brushes 106, which are spring pressed in appropriate holders 108 toward the strip as it passes over the guide rollers 54 and 57. The guide rolls 54 and 57 are rotatably mounted on stub shafts 110 forming part of blocks 112, see FIG. 3, which are fastened to the web plate by bolts 114 and each being held on its respective shaft by a washer 116 and bolt 118. A reinforcing plate 120 may be applied to the web plate 84 at the lower portion thereof to aid in supporting the guide rolls and to serve as a splash plate for electrolyte flowing from the plating disc.

The disc, see particularly FIGS. 3 and 4, is a two part member comprising a rear portion 122 and a front portion 124, the two portions when bolted together, as by bolts 126, or when cemented together presenting the peripheral groove 56 in which the tape 16 rides. Near the periphery of each of the two members is a liquid flow undercut portion which when the members are united, produce an elliptical channel or passageway 128 and a throat 130 with parallel side walls connecting the elliptical passageway with the grove 56 so that electrolyte flowing in passageway also flow via the throat against the undersurface of narrow longitudinal area of the tape. In order to conduct D.C. positive potential to the electrolyte flowing in the passageway and throat, a conducting ring 132 is embedded in the forward face of rearward member 122, whose outer peripheral face is part of the wall of the passageway or channel 128 in the member 122; this ring being connected at equally spaced intervals via conducting screws 134 with the circular conducting ring 96 on the rear face of the disc.

The rear face of the front member 124 of the disc is provided with a plurality of conducting grooves 136 arranged like spokes in a wheel, these grooves communicate at the peripheral portion of the disc with the elliptical passageway and near the center of the disc with a pipe 137 leading to a source of electrolyte.

The disc at its center has a bearing 138 of wear resistant material affixed to the disc which bearing and disc are rotatably mounted on a stub shaft 139 held to the web plate by screws 140. Suitable O rings 141 are provided to prevent fluid leakage between the shaft and bearing. A circular retaining plate 142 for the disc and bearing overlaps the disc bearing and stub shaft and is fastened to the stub shaft by screws 144. The rear face of the disc bears against a shoulder 146 on the stub shaft. The stub shaft has an upper portion thereof channeled to form a manifold 148, see FIGS. 2 and 3, serially communicating with the grooves 136 as the disc is rotated by reason of the frictional contact with the moving tape, several of the grooves being open to the manifold at any interval of time. The pipe 137 conducts electrolyte to the manifold. This electrolyte may be fed to the pipe either by gravity from a reservoir adjacent the disc or by a force pump. If by a gravity supply, it is preferable that the top level of the electrolyte in the reservoir be just above the level of the electrolyte in the top of the throat so that very little fluid pressure will exist at the contact area of tape and disc to minimize forcing of fluid out of the throat and leakage thereof along the undersurfaces of the tape, should the tape be warped. If flow of electrolyte is effected by a force pump, the pressure should be low.

The electrolyte by virtue of its pressure, whether by static pressure or force pump, will flow up the grooves 136 which are in communication with manifold 148 and against the undersurface of the tape at the area exposed through the throat. The liquid will then flow by gravity down in the passageway and throat on both sides of the disc and in contact with the tape and be discharged at the bottom of the disc.

Thus contact of the electrolyte with the tape will be made for a comparatively long time so that a heavy stripe plating of the tape, as the stripe 151, FIG. 7, is effected, the plating being effective simultaneously throughout the length of tape in contact with the throat.

An electrolyte delivery mouth 152 is located between the two guide rollers 54 and 57 and resilient portions 153 thereof are in liquid stripping contact with the plated face of the tape to guide the effluent from the disc to an electrolyte receiving tank 154 below the mouth. A front splash plate 156 is mounted on the tank in any convenient fashion, as by fork arms 157, to prevent electrolyte splash. The tank has mechanism (not shown) associated with it to normalize the strength of the metal salts in the solution, and the liquid in this tank is either pumped into the inlet pipe 137 or pumped into the constant liquid level reservoir from which the fluid is fed to the pipe 137.

In a modified form of invention shown in FIG. 6, the guide rolls 54 and 57 are replaced by rolls 160 and 162 and the tape leaving the gold stripe tank 50 passes between a pair of direction changing rolls 51 and 164 to the roll 160. When the tape leaves the roll 162 it is guided by the rolls 58 and 166 to the gold recovery tank 59. The stub shaft 168 in this form of the invention instead of having a single manifold portion, as portion 148 in the previously described form of invention, has two vertically opposed manifolds 170 and 172, the manifold 170 communicating with a pipe 174 leading to a constant level supply reservoir 176 supplied from the electrolyte normalizing tank 154 by suitable pump 178, piping 180 and a conventional float level control valve 182. The reservoir in this case is preferably located with the top surface of the liquid therein at the level of the bottom of the peripheral groove 56 in the disc or slightly above the groove.

As in the previous form of invention several conducting grooves 136 communicate simultaneously with manifold 170. Likewise in this form of invention a plurality of grooves communicate with manifold 172, which is evacuated via pipe 186 and suction pump 188; the suction pump discharging into the normalizing tank 154. As a result, plating electrolytic solution is fed from the reservoir 176 to manifold 170, thence via a number of conducting grooves 136 and by gravity flow to the top of the throat in the disc, thence downwardly on both sides of the disc in contact with the underside of a portion of the tape toward the lowermost ones of the grooves 136, from which grooves the electrolyte is by suction transferred to manifold 172 and to the normalizing tank 154. With this form of the invention, leakage by reason of warped tape material is reduced to a minimum since no pressure system is involved in effecting the contact of the electrolyte with the tape.

Thus, there is provided an improved method and apparatus for plating a discrete stripe of metal on a flexible electrically conductive material. By this method and means a metal stripe having uniformity of width and thickness is expeditiously and economically disposed on a moving tape material in an efficiently controlled and practical manufacturing manner.

While there have been shown and described what are at present considered the preferred embodiments of the invention, it will be obvious to those skilled in the art that various changes and modifications may be made therein without departing from the scope of the invention as defined by the appended claims.

What is claimed is:

1. An apparatus utilizing a direct current supply for plating a stripe of metal on a moving longitudinal electrically conductive flexible material comprising:

a disc having means for guiding said conductive material around its circular peripheral portion;

a channel formed around said disc at its peripheral portion having an electrode therein provided with means for connection to the positive pole of said direct current supply;

means for supplying said channel with a flowing electrolytic plating solution, said channel having an opening to afford communication of said solution with the periphery of the disc whereby the solution may contact the underside of said conductive material about the disc;

means for effecting electrical connection of said conductive material with the negative pole of said direct current supply; and means for effecting simultaneous advancement of said conductive material and rotation of said disc.

2. An apparatus as set forth in claim 1 wherein said disc has a groove formed about its periphery to prevent lateral displacement of said conductive material, said channel being formed to open into said groove.

3. An apparatus as set forth in claim 1 wherein at least two tape guide rollers are placed close to each other near the periphery of said disc, whereby said conductive material may be wrapped almost completely about the periphery of said disc.

4. An apparatus as set forth in claim 1 wherein passageways are provided in said disc to convey incoming plating solution to the top of said disc whereby the solution flows down both peripheral sides of the disc to the lowermost peripheral portion of said disc where it discharges.

5. An apparatus as set forth in claim 3 wherein at least two of said rollers are close to the bottom peripheral portion of said disc.

6. An apparatus as set forth in claim 3 wherein at least two of said rollers are close to the upper peripheral portion of said disc.

7. An apparatus as set forth in claim 1 wherein said solution is supplied to the channel by way of a first chamber in the axle rotatably supporting said disc and through radial passageways in said disc extending from said first chamber to said channel.

8. An apparatus as set forth in claim 7 wherein a second chamber below said first chamber is provided in the axle with a pipe connecting said second chamber with a pump.

9. An apparatus as set forth in claim 1 wherein means are provided for preliminarily applying a thin metallic strike in stripe form to said conductive material at the area which is to be subsequently plated with a heavier metallic stripe.

10. An apparatus as set forth in claim 9 wherein means are provided for applying a nickel coating to said conductive material prior to the application of said preliminary strike stripe.

11. An apparatus as set forth in claim 10 in which means are provided for cleaning the conductive material prior to the application of the nickel coating thereto.

12. An apparatus as set forth in claim 1 wherein means following the plating disc are provided to perform a deplating operation to remove stray stripe plating on said conductive material.

References Cited

UNITED STATES PATENTS

| | | | |
|---|---|---|---|
| 2,271,735 | 2/1942 | Hall | 204—206 |
| 1,766,201 | 6/1930 | Thormann | 204—28 XR |
| 2,052,962 | 9/1936 | Booe | 204—207 XR |
| 2,725,353 | 11/1955 | Strobel | 204—207 XR |
| 3,267,017 | 8/1966 | Greene et al. | 204—28 XR |
| 3,483,113 | 12/1969 | Carter | 204—206 |

HOWARD S. WILLIAMS, Primary Examiner

W. B. VAN SISE, Assistant Examiner

U.S. Cl. X.R.

204—28, 200, 212, 224